United States Patent
Yeh

(10) Patent No.: US 7,353,408 B2
(45) Date of Patent: Apr. 1, 2008

(54) USB (UNIVERSAL SERIAL BUS) INTERFACE DEVICE

(75) Inventor: Shih-Ping Yeh, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 428 days.

(21) Appl. No.: 10/874,367

(22) Filed: Jun. 24, 2004

(65) Prior Publication Data

US 2004/0268163 A1   Dec. 30, 2004

(30) Foreign Application Priority Data

Jun. 25, 2003   (TW) .............................. 92211580 U

(51) Int. Cl.
*G06F 1/00* (2006.01)
*G06F 11/30* (2006.01)
*G05F 1/00* (2006.01)

(52) U.S. Cl. .................. 713/300; 713/340; 323/271

(58) Field of Classification Search ............... 713/300, 713/330, 340; 439/502; 710/8, 62, 72; 323/271
See application file for complete search history.

(56) References Cited

U.S. PATENT DOCUMENTS

| | | | | |
|---|---|---|---|---|
| 5,884,086 | A * | 3/1999 | Amoni et al. | 713/300 |
| 6,283,789 | B1 * | 9/2001 | Tsai | 439/502 |
| 6,633,932 | B1 * | 10/2003 | Bork et al. | 710/72 |
| 6,915,419 | B2 * | 7/2005 | Chiu et al. | 713/2 |
| 7,043,646 | B2 * | 5/2006 | Enami et al. | 713/300 |
| 7,114,085 | B1 * | 9/2006 | Kim | 713/300 |
| 2003/0214273 | A1 * | 11/2003 | Mah et al. | 323/271 |

OTHER PUBLICATIONS

USBIF, Universal Serial Bus PlusPower Electro-Mechanical Specification Version 0.8f, 1999, USBIF, pp. 26.*

* cited by examiner

*Primary Examiner*—Suresh K Suryawanshi
(74) *Attorney, Agent, or Firm*—Birch, Stewart, Kolasch & Birch, LLP

(57) ABSTRACT

A USB connector cable includes a main cable having four separately formed wires, namely, a voltage wire, a first data transmission wire, a second data transmission wire and a ground wire, and a power cable having a voltage wire and a ground wire which are integrally and respectively formed with the voltage wire and the ground wire of the main cable.

14 Claims, 3 Drawing Sheets

USB (UNIVERSAL SERIAL BUS) INTERFACE DEVICE

BACKGROUND OF THE INVENTION

This Nonprovisional application claims priority under 35 U.S.C. § 119(a) on Patent Application No(s). 092211580 filed in TAIWAN, R.O.C. on Jun. 25, 2003, the entire contents of which are hereby incorporated by reference.

FIELD OF THE INVENTION

The present invention relates to a USB (Universal Serial Bus) device, more particularly to a USB interface device that is capable of interconnecting effectively an external peripheral device and a CPU of a personal computer and that is capable of providing electrical power to the external peripheral device for operating the same.

BRIEF DESCRIPTION OF THE RELATED ART

The rapid advent of electronic technology brings lots of improvement to the external peripheral devices, such as development of a multimedia display with fine pixel. The wide use of personal computers consequently results in fast development of the external peripheral devices, since the utility of the former is not complete without the latter. In other words, after a document is written in the personal computer, a printing machine is required to print out the document. A hard drive, an optical recording and reproducing instrument (DVD reading/writing device), an image scanner, and a printing machine are the most common external peripheral devices and they are generally used together with the personal computer so as to provide an outmost task.

It is known that in order to connect one of these external peripheral devices to a personal computer available in the market, the front or rear panel of the personal computer is provided with at least two USB ports such that the external peripheral devices can be connected to the PC via a USB connector cable. Development of the USB technology enables the CPU to connect the external peripheral devices with ease because after the attachment, the USB system installed within the CPU can automatically identify and actuate the appropriate program required by the external peripheral device. In addition, the USB interface device is arranged in such a manner to supply electrical power and data transmission between the CPU and the external peripheral device via a USB connector cable so that operation of the external peripheral device can be conducted through the CPU.

Note that in the USB interface device of recent production, a load switch is generally provided in order to protect the mother board from being damage due to overload of current. The load switch includes a current control chip and a fuse (such as a poly switch) that automatically opens the corresponding circuit once the flowing current exceeds a maximum load of 5V/500 mA, thereby preventing damage of the motherboard. According to the prior art USB technology, the load switch cannot be arranged in such a manner to carry a maximum current that is equivalent to the total amount of current required by the external peripheral device for operating the same. Under this condition and with reference to FIG. 4, an external peripheral device 32 is shown and is connected to the CPU of a personal computer via a USB connector cable, and the CPU is unable to supply electrical power for operating the external peripheral device. Since the external peripheral device requires a larger amount of current for operating the same, and has a power socket 321 for electrical connection with an external power source 4. An AC/DC adapter is needed to convert the alternate current into the direct current. The electrical connection of the external peripheral device with the personal computer is inconvenient due to employment of the AC/DC adaptor and is against the trench of portability.

The aforesaid situation is aggravated for a notebook computer since the latter is usually carried along with the user to a business conference. In order to reduce the burden of carrying the notebook computer, a plurality of built-in inner peripheral devices are generally designed and constructed as externally connectable accessories, which, in turn, require USB interface device for connecting the same to the notebook computer. A hard drive of 2.5 inches is the most common external peripheral device for connection with the notebook computer, requires a working current ranging from 500 mA to 1000 mA. The conventional USB interface device is unable to supply the aforesaid current amount to the hard drive. Under such a condition, the hard drive is connected to an external power source via a connecting cable, i.e. the hard drive may obtain the current from the external AC power source while it is electrically connected to a PS/2 port of the notebook computer. In the event, the notebook computer is not provided with the PS/2 port, an alternate connecting device complementing to the hard drive must be used for interconnecting the hard drive and the notebook computer.

SUMMARY OF THE INVENTION

The object of the present invention is to provide a USB (Universal Serial Bus) interface device that interconnect an external peripheral device to a notebook computer and that is adapted supply electrical power to the external peripheral device.

According to the present invention, a USB (Universal Serial Bus) interface device is mounted on a CPU of a computer for interconnecting the CPU and an external peripheral device, the CPU being provided with a power supply unit, the power supply unit capable of providing current to the external peripheral device via a USB interface for operation thereof, the USB interface device comprising: a load switch disposed between and interconnecting electrically the power supply unit and the external peripheral device, the load switch capable of carrying a maximum current load of 0.5 ampere; and a USB connector cable. The USB connector cable includes: a main cable having two opposite ends which are adapted to be connected electrically to the external peripheral device and the CPU for data transmission therebetween; and a power cable extending outwardly and laterally from the main cable between the opposite ends, and having a distal end adapted to be connected electrically to a power socket of the external peripheral device in order to supply electrical power from the CPU to the external peripheral device so as to permit operation of the external peripheral device. Preferably, the main cable includes four separately formed wires, namely, a voltage wire, a first data transmission wire, a second data transmission wire and a ground wire. The power cable includes a voltage wire and a ground wire that are respectively and integrally formed with the voltage wire and the ground wire of the main cable. The load switch includes a current control chip and a fuse that opens the corresponding circuit when the current exceeds the maximum current load of 2 ampere.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the following detailed description and the accompanying drawings, which are given by way of illustration only, and thus are not limitative of the present invention, and wherein.

DETAILED DESCRIPTION OF THE PREFERRED EMBODIMENT

Figure 1:
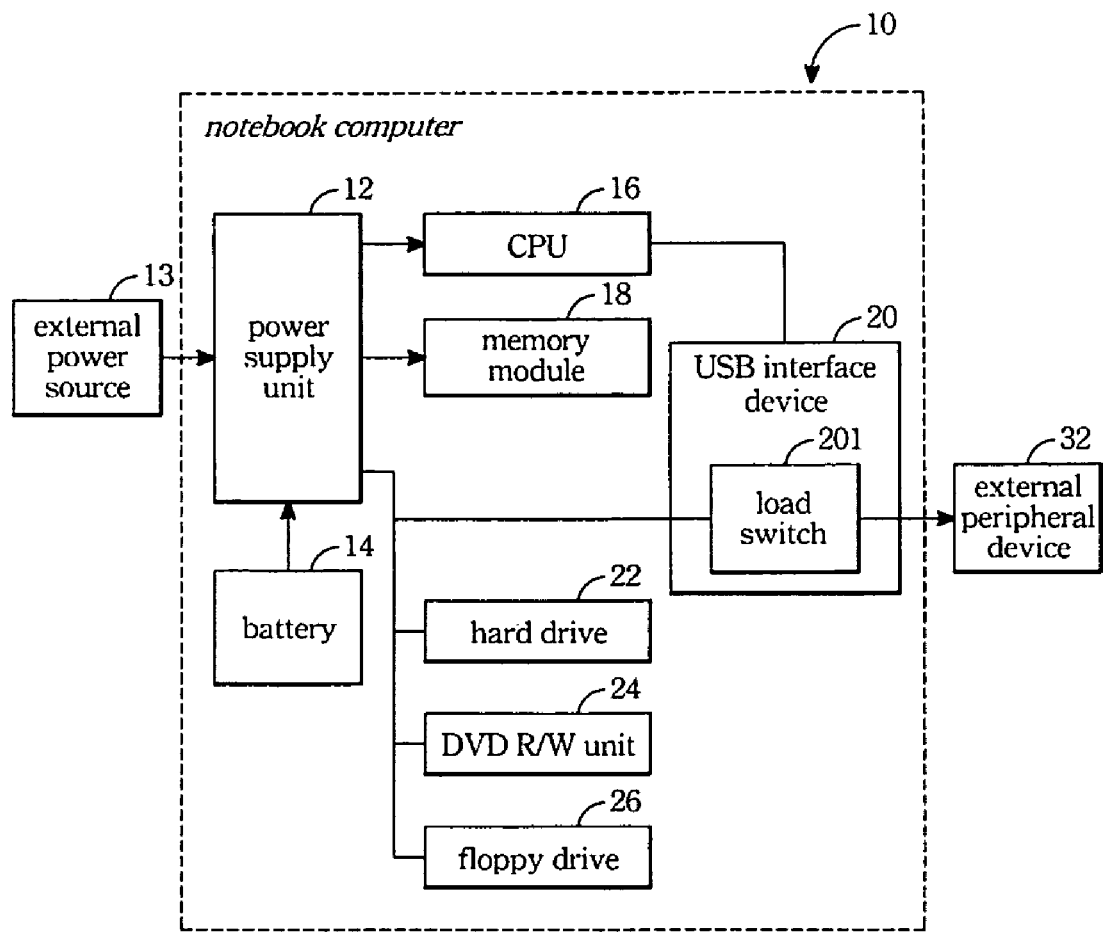
FIG. 1 is a block diagram, illustrating interconnection between a personal computer provided with a USB interface device of the present invention and an external peripheral device.

Before the present invention is described in greater detail with reference to the following preferred embodiment, it should be noted that same reference numerals have been used to denote similar elements throughout the specification.

Referring to FIG. 1, the preferred embodiment of a USB (Universal Serial Bus) interface device 20 according to the present invention is shown and mounted within a notebook computer 10, and is adapted to interconnect the notebook computer 10 and an external peripheral device 32. The preferred embodiment includes a load switch 201 and a USB connector cable 30 (see FIG. 2).

As illustrated, the notebook computer 10 includes a power supply unit 12 for connection to an external power source 13, a battery 14, a CPU (Central Processing Unit) 16, a memory module 18, the USB interface device 20, and a plurality of built-in peripheral devices. The built-in peripheral devices may include a hard drive 22, a DVD reading/writing unit 24 and a floppy drive 26. The power supply unit 12 is adapted convert the AC current from the power source 13 into the DC current so as to supply the specific current and voltage required by all the components. For example, the CPU requires an input of 3.5 volts for operation while the USB interface device 20 requires an input of 5 volts for operation.

Figure 2:
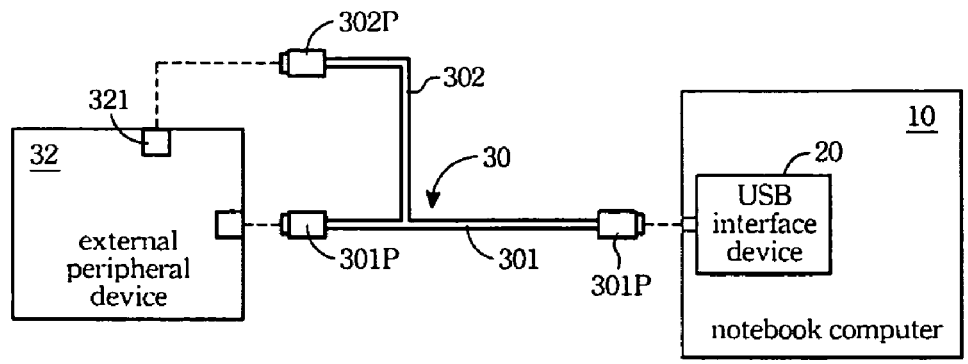
FIG. 2 is a block diagram, illustrating how the USB interface device of the present invention is connected to the peripheral device via a USB connector cable.
Figure 3:
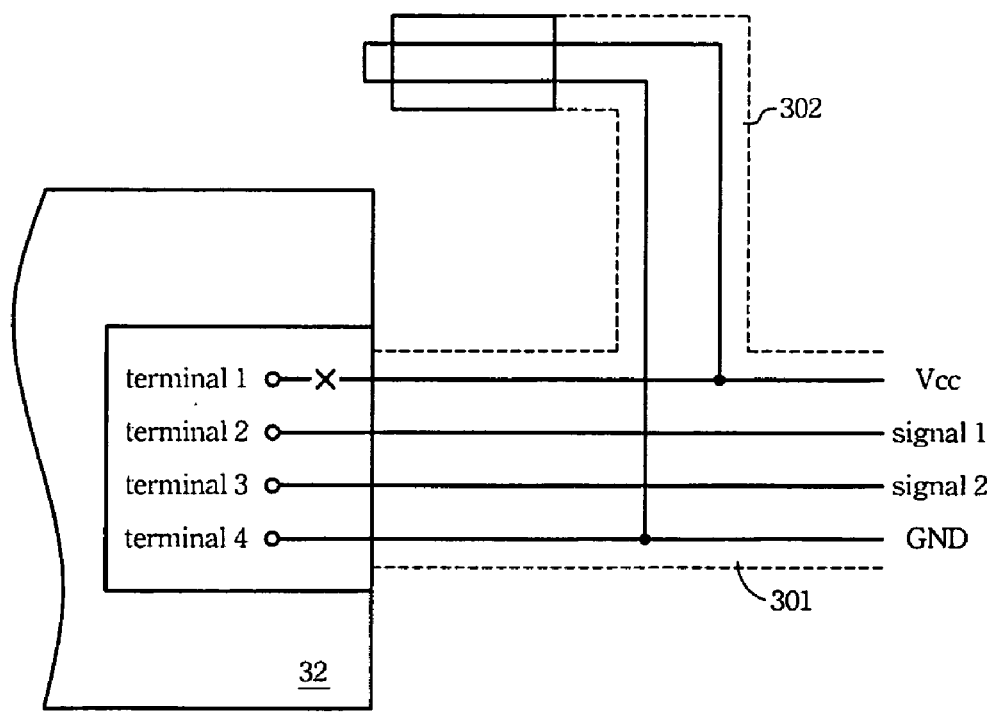
FIG. 3 shows a detailed view of the USB connector cable interconnecting the external peripheral device and the USB interface device of the present invention.

Referring to FIG. 2, the USB interface device 20 is not only connected to the power supply unit 12 but also to the CPU 16 via the USB connector cable 30. Note that the USB interface device 20 of the present invention can supply a maximum current of 2 ampere in order to response the specific current and voltage required by the external peripheral devices. However, in order to prevent the motherboard from damage, a load switch 201 is provided between and interconnects electrically the power supply unit 12 and the external peripheral device 32. The load switch 201 is capable of carrying a current load ranging between 0.5 and 2 amperes, and includes a current control circuit and a fuse (preferably a poly switch). Thus, when the required current for operating the external peripheral device 32 exceeds the amount of 2 amperes, the USB interface device 20 is converted into a state, in which, the USB interface device 20 is disconnected electrically from the external peripheral device 32, thereby stopping the electrical power supply to the external peripheral device 32. The USB interface device 20 can be selected from 1.0, 1.1 and 2.0 versions.

Figure 4:
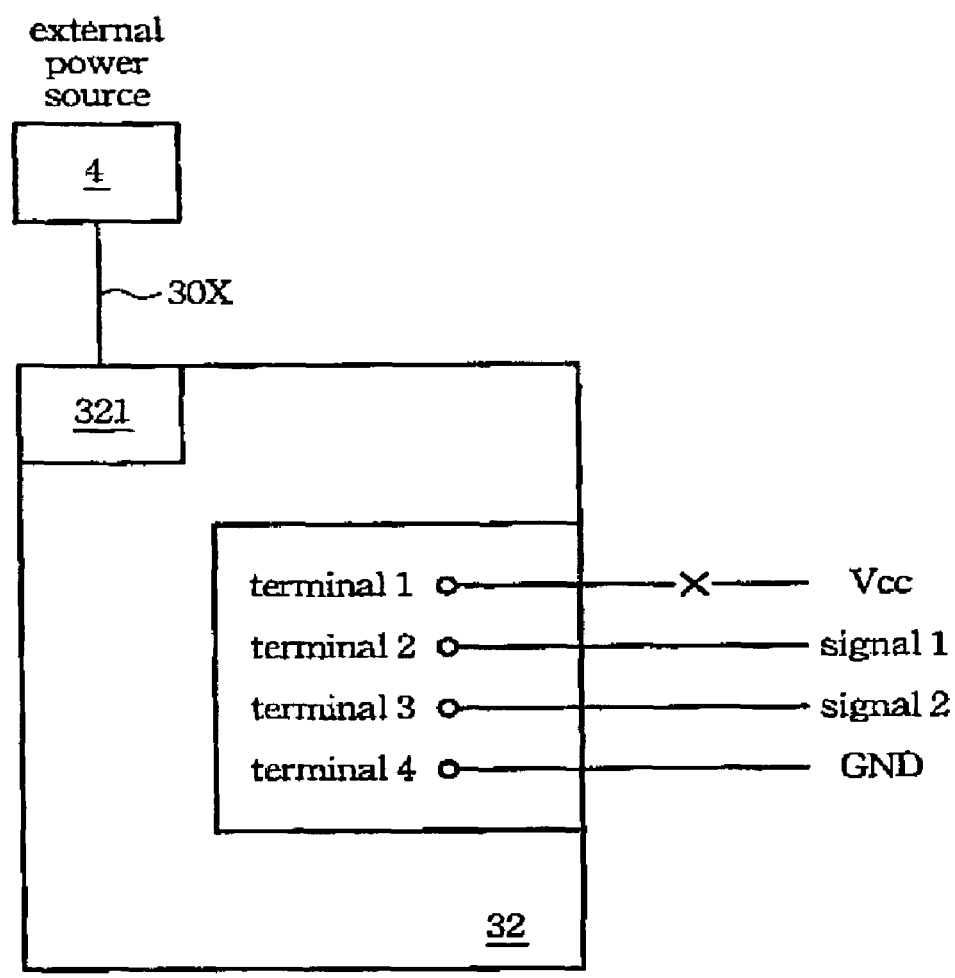
FIG. 4 illustrates how a prior art USB connector cable interconnects a CPU of a personal computer and an external peripheral device.

Referring to FIG. 4, an important aspect to note that when the USB based external peripheral device 32 available presently at the market needs a current of more than 500 mA to operate the same, a connecting cable 30X is required for connection to an external power source 4 in order to provide the required current to the USB based external peripheral device 32. FIG. 4 illustrates how a prior art USB connector cable interconnect the external peripheral device 32 and an electronic instrument (such as a notebook computer), in which, the voltage wire (Vcc) of the prior art USB connector cable is not used, since the electrical power for operating the external peripheral device 32 comes from the external power source 4.

In order to solve the aforesaid problem, the USB connector cable 30 (see FIG. 2) is used together with the USB interface device 20 of the present invention. The USB connector cable 30 includes a main cable 301 and a power cable 302. The main cable 301 has two opposite ends, which are adapted to be connected electrically to the external peripheral device 32 and the CPU of the notebook computer for data transmission therebetween. The power cable 302 extends outwardly and laterally from the main cable 301 between the opposite ends, and has a distal end adapted to be connected electrically to a power socket 321 of the external peripheral device 32 in order to supply electrical power from the notebook computer 10 to the external peripheral device 32 so as to permit operation of the external peripheral device 32.

In the preferred embodiment, the external peripheral device 32 is formed with a USB port and the notebook computer 10 is formed with a USB port. The USB connector cable 30 further includes two USB plugs 301P which are provided respectively to the opposite ends of the main cable 301 and which are adapted to be plugged respectively into the USB port of the external peripheral device 32 and the USB port of the CPU 10. The USB connector cable 30 further includes a plug 302P that is connected to the distal end of the power cable 302, that is adapted to be plugged into the power socket 321 of the external peripheral device 32 and that has a configuration different from a respective one of the USB plugs 301P.

The main cable 301 includes four separately formed wires, namely, a voltage wire (Vcc), a first data transmission wire (signal 1), a second data transmission wire (signal 2) and a ground wire (GND). The power cable 302 includes a voltage wire (Vcc) and a ground wire (GND), which are respectively and integrally formed with the voltage wire (Vcc) and the ground wire (GND) of the main cable 301.

In contrast to the prior art USB connector cable, the voltage wire (Vcc) and the ground wire (GNB) of the power cable 302 are integrally and respectively formed with the voltage wire (Vcc) and the ground wire (GNB) of the main cable 301 in order to supply electrical power the external peripheral device 32. The object of reducing the burden of the notebook computer is accordingly achieved.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What claim is claimed:

1. A USB (Universal Serial Bus) connector device for interconnecting electrically an electronic instrument and an external peripheral device, the USB connector device comprising:

a USB interface adapted to be mounted on the electronic instrument, and adapted to supply electrical power to the external peripheral device for data transmission therebetween, said USB interface for supplying a maximum current of 2 amperes wherein, when the required current for operating the external peripheral device exceeds the amount of 2 amperes, said USB interface is converted into a state, during which state said USB interface is disconnected electrically to the external peripheral device, thereby stopping the electrical power supply to the external peripheral device;

a load switch, mounted on said USB interface wherein, when the required current for operating the external peripheral device exceeds the amount of 2 amperes, said USB interface is converted into a state, during which state said USB interface is disconnected electrically to the external peripheral device; and a USB connector cable including:

a main cable having two opposite ends which are adapted to be connected electrically to the external peripheral device and said USB interface for data transmission therebetween, and a power cable extending outwardly and laterally from said main cable between said opposite ends, and having a distal end adapted to be connected electrically to the external peripheral device in order to supply electrical power required by the external peripheral device for operation thereof.

2. The USB (Universal Serial Bus) connector device according to claim 1, wherein said load switch includes a current control chip and a fuse.

3. The USB (Universal Serial Bus) connector device according to claim 1, wherein said load switch includes a current control chip and a poly switch.

4. The USB (Universal Serial Bus) connector device according to claim 1, wherein the external peripheral device is formed with a USB port and the electronic instrument is formed with a USB port, the USB connector device further comprising two USB plugs which are provided respectively to said opposite ends of said main cable and which are adapted to be plugged into the USB port of the external peripheral device and the USB port of the electronic instrument.

5. The USB (Universal Serial Bus) connector device according to claim 4, wherein the external peripheral device is further formed with a power socket, the USB connector device further comprising a plug that is connected to said distal end of said power cable, that is adapted to be plugged into the power socket of the external peripheral device and that has a configuration different from a respective one of the USB plugs.

6. The USB (Universal Serial Bus) connector device according to claim 1, wherein said main cable has four separately formed wires, including a voltage wire, a first data transmission wire, a second data transmission wire and a ground wire.

7. The USB (Universal Serial Bus) connector device according to claim 6, wherein said power cable includes a voltage wire and a ground wire which are respectively and integrally formed with said voltage wire and said ground wire of said main cable.

8. A USB (Universal Serial Bus) interface device mounted on a CPU of a computer for interconnecting the CPU to an external peripheral device, the CPU being provided with a power supply unit, the power supply unit capable of providing current to the external peripheral device via the USB interface for operation thereof, the USB interface device comprising:

a load switch disposed between and interconnecting electrically the power supply unit and the external peripheral device, said load switch for carrying a maximum current load of 2 amperes wherein, when the required current for operating the external peripheral device exceeds the amount of 2 amperes, said USB interface device is converted into a state, during which state said USB interface device is disconnected electrically to the external peripheral device.

9. The USB interface device according to claim 8, wherein said load switch includes a current control chip and a fuse.

10. The USB (Universal Serial Bus) interface device according to claim 8, wherein said load switch includes a current control chip and a poly switch.

11. The USB (Universal Serial Bus) interface device according to claim 8, wherein the external peripheral device is selected from a group consisting of a CD ROM, an optical reading/writing apparatus, and a hard drive.

12. A USB interface device for interconnecting a CPU of a computer and an external peripheral device, the CPU being provided with a power supply unit, the power supply unit being capable of providing current to the external peripheral device via the USB interface device for operation thereof, the USB interface device comprising:

a load switch disposed between and interconnecting electrically the power supply unit and the external peripheral device, said load switch for carrying a maximum current load of 2.0 ampere wherein, when the required current for operating the external peripheral device exceeds the amount of 2 amperes, said USB interface device is converted into a state, during which state, said USB interface device is disconnected electrically to the external peripheral device; and a USB connector cable, including:

a main cable having two opposite ends which are adapted to be connected electrically to the external peripheral device and the CPU for data transmission therebetween; and a power cable extending outwardly and laterally from said main cable between said opposite ends, and having a distal end adapted to be connected electrically to a power socket of the external peripheral device in order to supply electrical power from the CPU to the external peripheral device so as to permit operation of the external peripheral device.

13. The USB interface device according to claim 12, wherein said main cable has four separately formed wires, including a voltage wire, a first data transmission wire, a second data transmission wire and a ground wire.

14. The USB (Universal Serial Bus) interface device according to claim 12, wherein said power cable includes a voltage wire and a ground wire which are respectively and integrally formed with said voltage wire and said ground wire of said main cable.

* * * * *